United States Patent
Kotiranta et al.

(10) Patent No.: US 10,174,400 B2
(45) Date of Patent: Jan. 8, 2019

(54) METHOD FOR RECOVERING METALS

(71) Applicant: OUTOTEC (FINLAND) OY, Espoo (FI)

(72) Inventors: Tuukka Kotiranta, Pori (FI); Kari Valkama, Pori (FI)

(73) Assignee: OUTOTEC (FINLAND) OY, Espoo (FI)

( * ) Notice: Subject to any disclaimer, the term of this patent is extended or adjusted under 35 U.S.C. 154(b) by 357 days.

(21) Appl. No.: 14/892,070

(22) PCT Filed: May 22, 2014

(86) PCT No.: PCT/FI2014/050399
§ 371 (c)(1),
(2) Date: Nov. 18, 2015

(87) PCT Pub. No.: WO2014/188077
PCT Pub. Date: Nov. 27, 2014

(65) Prior Publication Data
US 2016/0115563 A1    Apr. 28, 2016

(30) Foreign Application Priority Data
May 23, 2013 (FI) ................................ 20135556

(51) Int. Cl.
*C22B 3/10* (2006.01)
*C22B 3/44* (2006.01)
(Continued)

(52) U.S. Cl.
CPC ............ *C22B 3/10* (2013.01); *C22B 3/02* (2013.01); *C22B 3/08* (2013.01); *C22B 3/14* (2013.01);
(Continued)

(58) Field of Classification Search
CPC ......... C22B 3/10; C22B 3/44; C22B 15/0069; C22B 23/0423
See application file for complete search history.

(56) References Cited

U.S. PATENT DOCUMENTS 3,846,117 A    11/1974   Gandon et al.
3,998,924 A *  12/1976   Jones ................... C01G 3/003
                                                              423/100
(Continued)

FOREIGN PATENT DOCUMENTS

AU    2012 203 546 A1    1/2013
AU    2012203546 A1 *    1/2013
(Continued)

OTHER PUBLICATIONS

CN 102602979 A Machine translation. (Year: 2012).*
(Continued)

*Primary Examiner* — George Wyszomierski
*Assistant Examiner* — Tima M McGuthry-Banks
(74) *Attorney, Agent, or Firm* — Buchanan, Ingersoll & Rooney PC

(57) ABSTRACT

The invention relates to a method and apparatus for recovering metals from metalliferous starting materials comprising steps of
i) leaching the metalliferous starting material in chloride-based leaching liquor,
ii) withdrawing from the leaching step i) aqueous chloride solution with dissolved metals,
iii) recovering metal value from the aqueous chloride solution in a metal recovery process step,
iv) neutralizing hydrogen chloride content of the aqueous chloride solution in the metal recovery process step with adding hydrolyzed ammonia to the process solution so as to form ammonium chloride,
(Continued)

v) withdrawing ammonium chloride containing process solution to an ammonium regeneration step where calcium-containing reagent is added to generate calcium chloride and ammonia gas and recycling ammonia back to the metal recovery process step iii), vi) regenerating the $CaCl_2$-solution with $H_2SO_4$ so as to provide a aqueous HCl solution for recycling to the leaching step i).

31 Claims, 4 Drawing Sheets

(51) Int. Cl.
| | |
|---|---|
| *C22B 15/00* | (2006.01) |
| *C22B 23/00* | (2006.01) |
| *C22B 3/02* | (2006.01) |
| *C22B 3/08* | (2006.01) |
| *C22B 3/14* | (2006.01) |
| *C22B 3/42* | (2006.01) |
| *C22B 3/00* | (2006.01) |

(52) U.S. Cl.
CPC .............. *C22B 3/42* (2013.01); *C22B 3/44* (2013.01); *C22B 15/0069* (2013.01); *C22B 15/0071* (2013.01); *C22B 15/0078* (2013.01); *C22B 15/0089* (2013.01); *C22B 23/043* (2013.01); *C22B 23/0423* (2013.01); *C22B 23/0446* (2013.01); *C22B 23/0453* (2013.01); *Y02P 10/234* (2015.11)

(56) References Cited

U.S. PATENT DOCUMENTS

| | | | |
|---|---|---|---|
| 4,272,492 | A | 6/1981 | Jensen |
| 4,462,976 | A * | 7/1984 | Karger .................. C01B 7/035 210/702 |
| 6,231,823 | B1 | 5/2001 | Genik-Sas-Berezowsky et al. |
| 7,736,606 | B2 | 6/2010 | Harris et al. |
| 7,901,484 | B2 * | 3/2011 | Mendes .................. C22B 3/42 205/587 |
| 9,783,428 | B1 * | 10/2017 | Demopoulos ........... C01F 11/46 |
| 2006/0222580 | A1 * | 10/2006 | Tinkler ............... C22L 33/0017 423/42 |
| 2007/0295613 | A1 | 12/2007 | Moyes et al. |
| 2008/0110296 | A1 * | 5/2008 | Thomas .................. B01J 41/04 75/723 |
| 2011/0142736 | A1 | 6/2011 | Pereira et al. |

FOREIGN PATENT DOCUMENTS

| | | | | |
|---|---|---|---|---|
| CN | 101285127 A | | 10/2008 | |
| CN | 101328538 A | | 12/2008 | |
| CN | 101428914 | * | 5/2009 | |
| CN | 101509072 A | | 8/2009 | |
| CN | 101575673 A | | 11/2009 | |
| CN | 101717110 A | * | 6/2010 | |
| CN | 102560109 A | * | 7/2012 | |
| CN | 102560109 A | | 7/2012 | |
| CN | 102602979 A | * | 7/2012 | |
| CN | 102712965 A | | 10/2012 | |
| GB | 1019798 A | * | 2/1966 | ............... C22B 3/10 |
| GB | 1342400 A | * | 1/1974 | ............ C01G 3/003 |
| IN | 1152/MUM/2006 | * | 6/2008 | |
| WO | WO 00/41967 A1 | | 7/2000 | |
| WO | WO 2006/029439 A1 | | 3/2006 | |
| WO | WO 2011/114000 A1 | | 9/2011 | |
| WO | WO 2013/030450 A1 | | 3/2013 | |

OTHER PUBLICATIONS

CN 102560109 A Machine translation (Year: 2012).*
CN 101717110 A Machine translation (Year: 2010).*
CN 101428914 Machine translation (Year: 2009).*
CN 102602979 A human translation (Year: 2012).*
CN 102560109 A human translation (Year: 2012).*
CN 101717110 A human translation (Year: 2010).*
Office Action (Notification of the First Office Action) dated Aug. 29, 2016, by the State Intellectual Property Office of the People's Republic of China in corresponding Chinese Patent Application No. 201480032663.X (25 pages including partial English translation).
G.J. Nel et al. "Novel Design Aspects of the Tati Activox® Project Ammonia Recovery Circuit" The Southern African Institute of Mining and Metallurgy Base Metals Conference 2009, Dec. 31, 2009, pp. 201-214.
International Search Report (PCT/ISA/210) dated Sep. 11, 2014, by the Finnish Patent Office as the International Searching Authority for International Application No. PCT/FI2014/050399.
Amer et al., "The recovery of zinc from the leach liquors of the CENIM-LNETI process by solvent extraction with di(-2-ethylhexyl)phosphoric acid", Hydrometallurgy, Apr. 1995, pp. 323-337, vol. 37, No. 3.
Office Action (Notification of the Second Office Action) dated May 3, 2017, by the State Intellectual Property Office of the People's Republic of China in corresponding Chinese Patent Application No. 201480032663.X (18 pages including partial English translation).
Notification of the Third Office Action issued by the State Intellectual Property Office of the People's Republic of China in corresponding Chinese Patent Application No. 201480032663.X dated Dec. 21, 2017 (17 pages including partial English translation).

* cited by examiner

METHOD FOR RECOVERING METALS

FIELD OF THE INVENTION

The present invention relates to a method and apparatus for recovering metals from metalliferous starting materials by using atmospheric chloride-based leaching.

BACKGROUND OF THE INVENTION

Sulphide ores account currently 60% of nickel production and the rest is produced from laterite ores. Ferronickel is produced from saprolite laterites by pyrometallurgical processes. High pressure acid leaching (HPAL) is used to produce pure nickel from limonite and smectite laterite ores. Sulphide ores are first concentrated and smelted after which nickel matte can be refined hydrometallurgically. The matte is first leached in an autoclave after which the solution is purified and pure nickel is recovered by electrowinning.

In conventional sulphate based processing ammonia is sometimes used as a neutralizing agent in solution purification. It is usually crystallized as ammoniumsulphate after metals recovery. It is used for fertilizer production so an extensive purification is required beforehand crystallization in order to avoid the transfer of toxic heavy metals to ammonium sulphate product.

According to Hydrometallurgy 2008: Proceedings of the sixth international symposium, edited by Courtney A. Young et al, $1^{st}$ edition, pp. 541 to 550 it is estimated that around 70% of the world's land-based Ni resources are contained in laterite ores. However, due to technological constraints, only about 40% of Ni produced is currently extracted from such ores. There is a tendency in the industry to develop atmospheric leaching process. The Hydrometallurgy 2008 publication cites a few of them. Chloride-based alternatives include for example the Atmospheric Chloride Leach (ACL) Process, which consists of an atmospheric leach in hydrochloric acid solution containing a high background of $MgCl_2$. The rest of the circuit comprises the removal of Fe impurity with internally recycled MgO, recovery of valuable Ni and Co and finally the pyrohydrolysis to recover the stoichiometric equivalent HCl from a bleed stream, i.e. the acid consumed by Fe and Mg during the leaching step. Another chloride-based process cited in Hydrometallurgy 2008 is the Intec Nickel Laterite Process using $H_2SO_4$ to regenerate HCl, rather than pyrohydrolysis. The process operates via the calcium chloride/sulphate cycle which essentially requires the replacement of the leached metal cation (predominantly Fe and Mg), with the equivalent amount of Ca during neutralisation with lime. The total amount of proton consumed in the circuit is then replaced by adding $H_2SO_4$, causing the precipitation of a sparsely soluble calcium sulphate salt. The regenerated HCl is again utilised in the atmospheric leaching step. It is stated in Hydrometallurgy 2008, that it is unlikely that $H_2SO_4$ and CaO can be regenerated economically via thermal decomposition of the calcium sulphate salt, hence the higher the impurity content of the feed ore, the more $H_2SO_4$ and lime/limestone make-up would have to be added, making the process economics very sensitive to the local price of reagents.

US 2007/0295613 discloses a process for recovering a target metal from an oxidised metalliferous material comprising in an acid generation stage, adding sulphuric acid to a solution comprising a metal halide to generate an acidic aqueous halide solution; in a leaching stage that is separate to the acid generation stage, leaching the oxidised metalliferous material with the acidic aqueous halide solution to leach the target metal into solution; passing the solution from the leaching stage to the target metal recovery stage in which the target metal is recovered from the solution whilst the metal halide is retained in solution and returning the solution with the metal halide therein from the target metal recovery stage to the acid generation stage. Only hydrochloride is regenerated and metals are precipitated with a solid reagent, thus the purification of metals through extraction is not possible in this process configuration. Thus, only intermediate products are produced and they require further processing.

U.S. Pat. No. 6,231,823 discloses a process for separating cobalt values from nickel values in an aqueous nickel and cobalt sulphate containing solution, wherein the solution is contacted with a water-immiscible organic solution containing an organo-phosphorous acid in a cobalt extraction circuit. The process includes contacting the water-immiscible organic solution required for cobalt extraction with nickel-containing ammoniacal solution to produce a nickel-loaded organic phase and a partially nickel-depleted raffinate. The nickel-containing ammoniacal solution is generated by adjustment of the nickel-containing raffinate from the cobalt extraction circuit, by additions of ammonia, preferably as ammonium hydroxide and ammonium sulphate.

WO 2006/029439 discloses a process for extracting metal ions from aqueous solutions. In particular, the invention relates to a process for preparing an organic solution containing an extractant loaded with nickel ions and using that solution in a process to obtain nickel, cobalt and/or manganese ions from an aqueous solution containing these ions. The organic extractant may be pre-loaded with ions, such as ammonium ions. WO 2011/114000 discloses a hydrometallurgical method for producing metallic nickel from nickel sulphide concentrate, ore or scrap, which method comprises leaching the nickel sulphide material with chloride leach solution, extracting the dissolved nickel to produce a nickel sulphate containing electrolyte, recovering nickel by electrowinning and regenerating depleted chloride containing process solutions from extraction and electrowinning in chlorine-alkali electrolysis stage to recover chlorine, hydrogen and sodium hydroxide back to the process.

WO 2011/114000 discloses a hydrometallurgical method for producing metallic nickel from nickel sulphide concentrate, ore or scrap, which method comprises leaching the nickel sulphide material with chloride leach solution, solvent extraction of nickel and cobalt by using sodium hydroxide as a neutralizing agent, recovering nickel by electrowinning from nickel sulphate solution and regeneration of hydrochloric acid and sodium hydroxide in chlorine-alkali electrolysis stage.

U.S. Pat. No. 7,736,606 B2 discloses a chloride-based atmospheric leaching process where feed material is leached with HCl, $MgCl_2$ and an oxidant. The rest of the circuit comprises the removal of Fe impurity with internally recycled MgO, recovery of valuable Ni and Co and finally the pyrohydrolysis of $MgCl_2$ to recover the stoichiometric equivalent HCl and MgO.

WO 00/41967 discloses a process for the recovery of ammonia from an ammonia sulfate solution, the process comprising the method steps of combining ammonium sulfate solution and quicklime (CaO) in a milling means to provide a reaction slurry; and running the milling means whereby the milling action acts to break up any gypsum precipitate as it forms in the reaction slurry or milling means.

G. J. Nel and A. D. van den Berg have presented in "Novel Design Aspects of the Tati Activox® Project Ammonia Recovery Circuit" published in The Southern African Institute of Mining and Metallurgy Base Metals Conference 2009 a technology to selectively recover base metals from low-grade base metal sulphide concentrates. Ammonia is used as neutralization agent in the cobalt and nickel solvent extraction plants to selectively extract the base metals. In more detail Nel and van den Berg disclose a sulphate based technology to selectively recover base metals from low-grade base metal sulphide concentrates. Ammonia is used as neutralization agent in cobalt and nickel solvent extractions and afterwards ammonia is regenerated with lime. Gypsum precipitation takes place in ammonia regeneration making it very difficult as gypsum would precipitate on the surface of a calcium containing reagents and prevent them from reacting in the slurry. High amount of solids in the slurry will make operation of ammonia stripping to gas phase harder due to plugging. In addition the solution after this process is a waste that contains at least sulphates and environmental regulations might make the disposal of this waste expensive in certain parts of the world.

BRIEF DESCRIPTION OF THE INVENTION

An object of the present invention is thus to provide a method and an apparatus for implementing the method so as to provide an excellent method for recovering metals from starting materials containing the same. The objects of the invention are achieved by a method and an apparatus, which are characterized by what is stated in the independent claims. The preferred embodiments of the invention are disclosed in the dependent claims.

It has been now surprisingly found out that in a chloride-based process metals are leached at atmospheric pressure and the chemicals required for the metal recovery can be regenerated without generating significant amounts of waste.

The method of the present invention has advantages over the teachings of prior art. The leaching is done in a chloride-based solution and therefore it is not required to ground the feed material into a very fine particle size. This saves energy needed for the process and also improves the filterability of the leaching residue, i.e. makes it more easily separable. In addition to that chloride-based leaching can be performed under atmospheric pressure and at a temperature below the boiling point of the solution, typically below 100° C., thus no autoclave is needed for the leaching step. An autoclave is more expensive to acquire and maintain than a normal atmospheric reactor. Sulphate-based leaching would require the use of an autoclave and in addition ammonium regeneration is difficult, if not impossible, due to the formation of gypsum.

A further advantage of the present invention is that when the ammonia regeneration is performed in a chloride solution no gypsum is precipitated, which gypsum precipitation would make the regeneration significantly more difficult. There are only minor amounts of solids present in the regeneration step and these solids are originating either from inert impurities introduced with lime or magnesium precipitating from the solution. In the chloride-based process the water balance can be controlled by evaporation and it is not necessary to take out waste waters from the process. Purifying and processing of such waste waters economically and in an environmentally friendly way can be very difficult. For example in the sulphate-based process described in prior art the slurry is directed out of the process from the ammonia regeneration step. The slurry contains at least sulphate and calcium. It has now surprisingly been found out that in a chloride-based process the calcium chloride solution formed in the ammonia regeneration can be used further in the acid regeneration step.

A further advantage of using chloride based leaching is that ammonia regeneration can be performed with calcium containing reagents without major gypsum precipitation which would happen in a sulphate based process. There are only minor amounts of solids present in the regeneration step and these solids are typically originating from inert impurities of calcium containing reagents.

Together with all the listed benefits, the method and apparatus is more economical than conventional methods.

Solid calcium-based neutralising chemicals cannot be used in liquid-liquid extraction, because solid agents form a stable mixture with water and the organic phase, which do not separate into separate phases. In large scale processes this can prohibit the extraction step from working. The present invention is based on the idea of providing a method wherein the starting material is leached in a chloride-based leaching solution in order to provide very pure products. The regeneration of ammonia enables the use of liquid-liquid extraction steps and hence, copper and nickel may be purified efficiently from impurities and recovered as high quality cathode in an electrolysis. Furthermore, cobalt may be separated from nickel by liquid-liquid extraction and be further precipitated as a product suitable for further processing. In this application liquid-liquid extraction means in other words solvent extraction.

BRIEF DESCRIPTION OF THE DRAWINGS

In the following the invention will be described in greater detail by means of example embodiments with reference to the attached drawings, in which.

DETAILED DESCRIPTION

Figure 1:
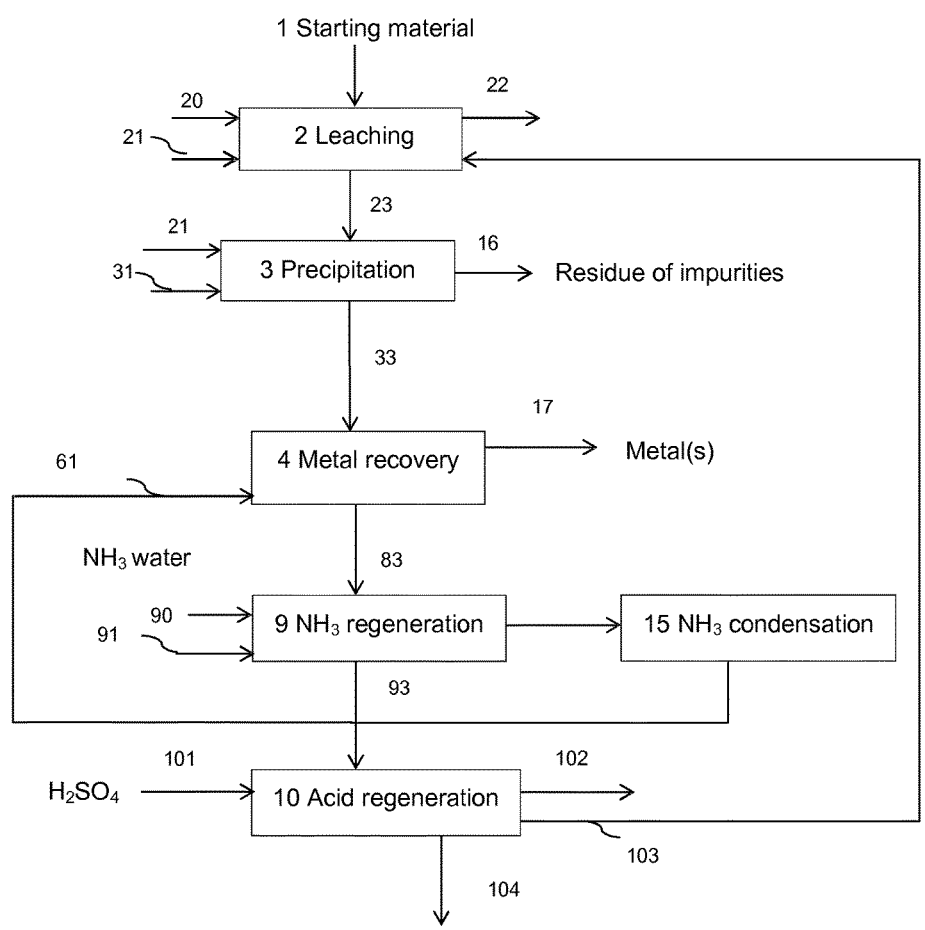
FIG. 1 is an example embodiment of the method of the invention in general form.

The invention relates to a method for recovering metals from metalliferous starting materials comprising steps of
i) leaching the metalliferous starting material in chloride-based leaching liquor,
ii) withdrawing from the leaching step i) aqueous chloride solution with dissolved metals,
iii) recovering metal value from the aqueous chloride solution in a metal recovery process step,
iv) neutralizing hydrogen chloride content of the aqueous chloride solution in the metal recovery process step with adding hydrolyzed ammonia to the process solution so as to form ammonium chloride,
v) withdrawing ammonium chloride-containing process solution to an ammonium regeneration step where calcium-containing reagent is added to generate calcium chloride and ammonia gas and, typically after condensation of ammonia gas, recycling ammonia back to the metal recovery process step iii), vi) regenerating the $CaCl_2$-solution with $H_2SO_4$ so as to provide an aqueous HCl solution for recycling to the leaching step i).

According to an embodiment of the invention the starting materials in the method of the present invention are selected from the group consisting of base metals—such as nickel- and cobalt-containing laterite ores, copper, cobalt, nickel metal-bearing raw materials, oxidized metalliferous material containing for example nickel, cobalt and copper, nickelferous sulphide material containing at least one other metal selected from the group consisting of cobalt, copper and iron, NiS precipitate, nickel matte, aqueous metal sulphate-containing solution the metals being selected from the group consisting of cobalt, copper, nickel and iron, nickel sulphide concentrate and mixtures thereof.

According to an embodiment of the invention the metals to be recovered are selected from the group consisting of nickel, cobalt and copper. Typically the starting materials may also comprise gold and platinum group metals. Typically the metals to be recovered are nickel, cobalt and copper or nickel and cobalt. According to a further embodiment of the invention also gold and platinum group metals (PGM) may be recovered.

According to an embodiment of the invention the method comprises in step iii) as a metal recovery process step at least one of the following, a) recovering of copper from the solution containing copper, cobalt and nickel in dissolved form thereby producing a stream containing copper and solution containing ammonium chloride, cobalt and nickel in dissolved form, b) recovering of cobalt from the solution thereby producing a stream containing cobalt and solution containing ammonium chloride and nickel, and c) recovering of nickel from the solution thereby producing a stream containing nickel and a solution containing ammonium chloride.

The recovery of copper may be performed by precipitation, extraction and/or ion exchange. The recovery of cobalt and nickel may be performed by extraction and/or ion exchange. Also gold and platinum group metals may be recovered, typically by extracting, if desired and present.

According to an embodiment of the invention the method comprises in the metal recovery process step steps a), b) and c). According to another embodiment of the invention the method comprises in the metal recovery process step steps b) and c).

For clarity reasons the details of the embodiments of the method of the present invention are now described step by step in the following paragraphs.

Leaching Step

The method comprises a leaching step, wherein the starting material is leached in the presence of calcium chloride, oxygen and a leaching solution comprising calcium chloride and hydrochloric acid under atmospheric pressure and in the temperature below the boiling point of the solution, to obtain a first solution containing copper, cobalt and/or nickel, and unavoidable impurities in dissolved form. In the leaching step the starting material, which is typically as presented above and more typically nickel matte or nickel concentrate, and hydrochloric acid are fed into a reactor together with oxygen-containing gas. The oxygen may be provided in any suitable form as a gas containing oxygen. Typically, the oxygen containing gas is oxygen, air, air enriched with oxygen or a mixture thereof. The leaching is performed typically by connecting several reactors in series and the total residence time is between 5 to 20 hours.

Typically the temperature is in the range of 80° C. to boiling point of the solution, more typically 80 to 104° C., more typically 80 to 100° C. even more typically in the range of 80 to 99° C.

Typically the chloride concentration in the leaching step is between 100 g/l and 350 g/l.

The pH in the leaching step is between −0.5 and 2.6. Typically the pH in the leaching step is between 1.5 and 2.5, if platinum group metals are not recovered or not contained in the starting material. In such cases the iron contained in the starting material is precipitated in the leaching step and thus the formation of acid is increased.

Otherwise the pH in the leaching step is between 0.5 and 1.5, i.e. when the platinum group metals are recovered and contained in the starting material. In such cases iron is not precipitated and the mass of the leaching residue is smaller. The separation of platinum group metals is more advantageous from a smaller amount of leaching residue.

In a chloride leaching process of nickel matte previously problem has been that gold and platinum group metals are dissolved even though the aim is to maintain them in the solid matter. This disadvantage has now surprisingly been solved by feeding any reducing agent, such as nickel matte or finely ground nickel matte to the end of the leaching process thereby lowering the redox potential and precipitating platinum group metals and most of the gold. The leaching process comprises typically a series of reactors and the end of the process means for example a separate reactor located after the leaching reactors.

Typically the recovery of gold and platinum group metals is performed by feeding to a separate method phase, such as a separate reactor, located downstream of the leaching reactor(s), a reducing agent, such as finely ground nickel matte and simultaneously no oxygen is fed to the process phase. Typically nickel matte, nickel concentrate or a reducing residue or side stream from another process is used as the reducing agent. Basically any commercially available reducing agent may be used. Finely ground nickel matte is typically used as it dissolves fast enough in order to achieve a sufficient yield for other metals and thus by using nickel matte no further costs are inquired. Finally, typically the solid matter is separated from the liquid by thickener and a filter. The gold remaining in the solution may be recovered by extraction from the overflowstream of the thickener, and thus gold and platinum group metals can be recovered with the method of the present invention.

In a continuous chloride process copper acts as oxidant in the leaching according to following reactions.

$$Me+2CuCl_2=MeCl_2(aq)+2CuCl(aq) \qquad (1)$$

wherein Me is Cu,Co,Ni $$Ni_3S_2(s)+6CuCl_2(aq)=3NiCl_2(aq)+6CuCl(aq)+2S(s) \qquad (2)$$

$$Cu_2S(s)+2CuCl_2(aq)=4CuCl(aq)+S(s) \qquad (3)$$

Reduced Cu(I) is oxidized back to Cu(II) with the help of oxygen.

$$4CuCl(aq)+4HCl(aq)+O_2(g)=4CuCl_2(aq)+2H_2O(aq) \qquad (4)$$

Only 5 to 20 weight-% of elemental sulphur is oxidized into sulphate in an atmospheric leaching. This reduces the oxygen consumption of the method compared to autoclave processes.

Typically the leaching residue is separated by conventional methods, such as with thickeners and/or filters.

Unavoidable impurities are typically e.g. iron, sulphate, magnesium, manganese, zinc, arsenic.

Precipitation Step

The method comprises an optional precipitation step, wherein the obtained first solution is contacted with at least one calcium-based compound, such as $CaCO_3$, $Ca(OH)_2$ or CaO, for purifying the first solution by precipitating unavoidable impurities as corresponding hydroxides and/or sulphates, to obtain a second solution containing copper, cobalt and nickel in dissolved form.

After the leaching especially iron is precipitated from the first solution by adding neutralising chemical containing calcium, such as $CaCO_3$, $Ca(OH)_2$ or CaO. Oxygen or oxygen-containing gas may also be added to the precipitation step in order to ensure that iron is in 3+ form and able to precipitate. The iron content in the solution is from 5 to 100 mg/l. At the same time arsenic and antimony possibly present in the solution are co-precipitated with iron. Also the sulphate content of the solution is lowered to be in the range of 0.1 to 0.6 g/l, as sulphate precipitates as gypsum. The sulphate content of the solution depends on the calcium content in the solution, which further depends on the iron content of the feed solution to the precipitation step. The calcium content after the iron removal is typically 35 to 100 g/l. The iron precipitate is separated and the second solution containing copper, cobalt and nickel is directed to copper recovery. The iron precipitate is typically separated by thickeners and filters. Typically, the total sulphur concentration as sulphate after iron precipitation is between 0.1 g/l-1 g/l.

Optional Evaporation Step

The method may comprise an optional evaporation step or steps in any suitable position(s) in the process for controlling the water balance of the method. Typically the evaporation step may be located before the copper recovery step, wherein the water balance of the method is treated by evaporating the second solution so that none of the compounds contained therein are crystallized. The water amount to be evaporated corresponds approximately to the water amount of washing waters fed into the method.

The solution is typically fed to a vacuum evaporator, typically in a temperature of 35-100° C. Third solution is withdrawn from the evaporation step.

Metal Recovery

The metals may be recovered with suitable methods, such as by extraction, ion exchange or precipitation.

Recovery of Copper

The method may comprise a step for recovering copper from the second and/or third solution containing copper, cobalt and nickel in dissolved form thereby producing a first stream containing copper and a fourth solution containing ammonium chloride, cobalt and nickel. The recovery of copper may be performed by extracting or by sulphide precipitation. Optionally a part of the copper can be precipitated and recycled back to the leaching.

Extraction of Copper

The copper contained in the second and/or third solution may be recovered by liquid-liquid extraction by using commercially available hydroxyoxime-based reagent, which is diluted into diluent, e.g. hydrocarbon diluent, such as kerosene. Examples of hydroxyoxime-based reagents are Agora M5640 by Cytec Industries Inc., wherein the active components are 2-hydroxy-5-nonylsalicyloxime and an ester modifier, and LIX 984N by BASF, wherein active components are 2-hydroxy-5-nonylsalicyloxime and 2-hydroxy-5-nonylacetophenone oxime. The aqueous second/third solution containing metals, i.e. copper, cobalt and nickel, is pumped into a mixer wherein also organic phase containing the extracting reagent is fed. The metals are extracted from the aqueous phase into the organic phase according to the following equation, wherein R is the skeleton of the extracting reagent. The hydrochloric acid formed in the reaction is partially or wholly neutralized with ammonia for enhancing the extraction.

$$CuCl_2(aq)+2RH(org)=CuR_2(org)+2HCl(aq) \quad (5)$$

$$NH_3(aq)+HCl(aq)=NH_4Cl(aq) \quad (6)$$

The phases are separated from each other with the help of gravity in a settler. The extracting of copper includes several mixer-settler-units and the phases flow in these units counter-currently. From the extraction step the organic phase is directed into a washing step, wherein the organic phase is mixed with copper sulphate solution containing sulphuric acid. The impurities contained in the organic phase are transferred into the water phase. Eventually the organic phase is mixed with the sulphur acid containing copper sulphate solution coming from the copper electrolysis (electrowinning) and thereby most of the copper is stripped to electrolytic solution. This solution is recycled back to the electrolysis wherein copper is recovered as cathode. The organic solution is returned from the stripping back to the extraction step. Typically, the process contains one or more copper solvent extractions and each of them contains 1-3 extraction stages, 1-3 washing stages and 1-3 stripping stages. Typically the copper in copper solvent extraction raffinate is precipitated as atacamite at pH between 2.5 and 5.

Precipitation of Copper

As an alternative for the extraction of copper the copper may be recovered by precipitation. The copper is precipitated as copper sulphide by using sodium sulphide, sodium hydrosulphide or hydrogen sulphide. In the precipitation reaction acid is formed, which is neutralized by using ammonia.

$$CuCl_2(aq)+H_2S(g)=CuS(s)+2HCl(aq) \quad (7a)$$

$$NH_3(aq)+HCl(aq)=NH_4Cl(aq) \quad (8)$$

Typically in addition to copper solvent extraction, the raffinate of copper solvent extraction may be subjected to residual copper removal by precipitation with calcium hydroxide slurry. The atacamite precipitate is separated with thickeners and/or filters and then it is recycled to the leaching step.

$$4CuCl_2(aq)+3Ca(OH)_2(s)=2Cu_2Cl(OH)_3(s)+3CaCl_2(aq) \quad (7b)$$

Extraction of Cobalt

The method may comprise a step for extracting cobalt from the second and/or third and/or fourth solution thereby producing a second stream containing cobalt and a fifth solution containing ammonium chloride and nickel. The cobalt is recovered by liquid-liquid extraction by contacting the solution containing cobalt with one or several extraction reagents diluted in a hydrocarbon solvent and where the extraction mechanism is based on cation exchange. Typically the process contains one or more cobalt solvent extractions and each of them contains 2-6 extraction stages, 1-3 washing stages and 1-4 stripping stages. The recovery of cobalt may be performed by ion exchange resin.

In the extraction of cobalt the cobalt is separated from nickel and at the same time metals interfering with the further processes, such as manganese, zinc, iron and copper are extracted from the second/third/fourth solution. The aqueous second/third/fourth solution is mixed with organic phase in a mixer-settler-unit. The organic phase contains extraction reagent and diluent, such as kerosene diluent. For example, commercial extractant Cyanex 272 by Cytec Industries Inc. can be used in this stage. Cyanex 272 has bis(2,4,4-trimethylpentyl)phosphinic acid as an active component. Any other reagents or mixtures of reagents where extraction is based on cation exchange mechanism are also suitable in this method. The extraction reagent is preneutralized in a separated step in order to avoid local pH peaks and precipitates. The ammonia solution may also be fed directly into mixers during extraction.

$$RH(org)+NH_3(aq)=RNH_4(org) \quad (9)$$

Metals to be extracted are transferred to organic phase according to the equation below.

$$MeCl_2(aq)+2RNH_4(org)=MeR_2(org)+2NH_4Cl(aq) \quad (10)$$

A small amount of calcium is extracted into the organic phase and it is washed with hydrochloric acid and/or small amount of product solution from stripping in a washing step after the extraction. Cobalt and other metals are stripped back to the aqueous phase with hydrochloric acid or sulphuric acid. This product solution does not contain nickel and cobalt may be recovered by using various methods.

$$MeR_2(org)+HCl(aq)=2RH(org)+MeCl_2(aq) \quad (11)$$

Extraction reagent residues are removed from the extraction raffinate so that they are not conveyed to the extraction of nickel. This may be done for example by kerosene wash and/or flotation and/or adsorption. After this the solution is conveyed, e.g. by pumping, to extraction of nickel.

Extraction of Nickel

The method may comprise a step of extracting nickel from the fifth solution thereby producing a third stream containing nickel and a sixth solution containing ammonium chloride. The nickel contained in the solution is purified by liquid-liquid extraction Typically, the method contains one or more nickel solvent extractions and each of them contains 2-6 extraction stages, 1-3 washing stages and 1-4 stripping stages.

The aqueous solution is mixed with the organic phase. The organic phase contains an extracting reagent and an organic diluent. For example commercial extractant Versatic 10 can be used in this stage. Its active component is a tertiary carboxylic acid which contains total of 10 carbon atoms. Any other reagents or mixtures of reagents wherein the extraction is based on cation exchange mechanism are also suitable in this method. The reagent is preneutralized with ammonia as is done in connection with the extraction of cobalt or ammounia is fed directly to mixers. Nickel is extracted in counter-current mixer-settler units, typically counter-current ones. A small amount of calcium is extracted with nickel as well. However, the amount of calcium extracted can be minimized by having final nickel loading in the organic phase between 70 to 98% of the experimentally determined maximum nickel loading. A high nickel loading allows nickel to replace calcium in the organic phase. The metals are extracted in accordance with the following equation, wherein R is an organic cation exchange extractant.

$$MeCl_2(aq)+2RNH_4(org)=MeR_2(org)+2NH_4Cl(aq) \quad (12)$$

Most of the calcium and ammonium extracted into the organic phase are washed with hydrochloric acid. The calcium content has to be lowered so low that no gypsum is precipitated in the next washing step. Most of the calcium is stripped from the organic phase so that the maximum calcium concentration in the aqueous solution of the following washing step is below 0.6 g/l. The wash solution is pumped back to the extraction and the organic phase to next washing step.

$$CaR_2(org)+HCl(aq)=2RH(org)+CaCl_2(aq) \quad (13)$$

In the following washing step rest of the calcium, chloride and ammonium are washed with diluted nickel electrolysis (electrowinning) solution. The wash solution in question contains sulphuric acid and nickel sulphate. The wash solution is pumped into leaching or hydrochloric acid regeneration. The organic phase is directed to stripping, wherein anolyte from nickel electrolysis is also pumped. Nickel is transferred to aqueous phase and from there nickel is recovered in electrolysis (electrowinning) as cathode.

$$NiR_2(org)+H_2SO_4(aq)=2RH(org)+NiSO_4(aq) \quad (14)$$

Regenerating Ammonia

Ammonium chloride is formed as a side product into the method solution in sulphide precipitation of copper and in all solvent extraction steps. Typically the ammonia is used in any of the liquid-liquid extractions to pre-neutralize the metal extractant molecule. Typically, the ammonia is fed directly to liquid-liquid extractions to neutralize hydrochloric acid which is formed in extraction reactions.

Typically the calcium containing reagent in step v) of the present method is calcium oxide and/or calcium hydroxide.

Typically, temperature is 25-100° C. and pressure is 7-200 kPa in ammonia regeneration step.

Typically, ammonia is stripped from solution to gas phase by using steam in ammonia regeneration step.

Typically, calcium chloride solution from ammonia regeneration is mixed with sulphuric acid solution so that gypsum and hydrochloric acid solution are formed.

The method comprises a step of regenerating the sixth solution containing ammonium chloride by contacting the solution with CaO and/or Ca(OH)$_2$ to obtain ammonia gas and a seventh aqueous solution containing calcium chloride. Ammonium chloride (NH$_4$Cl) is formed as a side product into the process solution in sulphide precipitation of copper and in extraction steps. Ammonium chloride is regenerated into ammonia with the help of calcium oxide or calcium hydroxide. At the same time other di- or trivalent metals present in the solution are precipitated as hydroxides.

$$NH_4Cl(aq)+Ca(OH)_2(s)=NH_3(g)+CaCl_2(aq) \quad (15)$$

$$Ca(OH)_2(s)+MeCl_2(aq)=Me(OH)_2(s)+CaCl_2(aq), \quad (16)$$

wherein Me=Mg, Ni, . . . .

The boiling point of ammonia is lower than the boiling point of water, so ammonia can be stripped from the solution into the gas phase with water steam. In other words, the vapour pressure of ammonia is higher than that of the vapour pressure of water at a certain pressure and temperature, so ammonia can be stripped from the solution into the gas phase with steam. Stripping of ammonia can be done for example in a column. The vapour is cooled in a condenser and the ammonia formed therein is recycled to be used in the recovery of copper, i.e. in the sulphide precipitation of copper or in the extraction of copper, in the extraction of cobalt and/or in the extraction of nickel. Ammonia is fed to the extraction steps in order to maintain the extracting. When ammonia regeneration is performed no further bases are needed and thus the amount of neutralizing chemicals, which is needed in the extraction, is decreased. The controlling of the method is easier and this results in a higher yield of the desired metals. In a typical extracting step the ammonia is fed into the mixer of the mixer-settler or there may be a separate phase, wherein the organic phase and ammonia are combined before the mixer.

Regeneration of Hydrochloric Acid

The method comprises a step of contacting the obtained seventh aqueous solution containing calcium chloride with sulphuric acid for precipitating gypsum and obtaining hydrochloride acid solution. In the previous process steps either ammonium chloride or calcium chloride are formed as side products. In the ammonia regeneration ammonium chloride reacts and calcium chloride is formed, so that the solution coming to hydrochloric regeneration contains in principle only calcium chloride. Typically, the solution coming to hydrochloric regeneration contains mainly calcium chloride Sulphuric acid is fed into one or more reactors, wherein gypsum and hydrochloric acid is formed. The sulphuric acid is fed in through several points in the step slowly and thereby the quality of the precipitate is improved. The formed slurry is fed to a filter wherein gypsum is separated and hydrochloric acid is recycled back to the leaching step of the method.

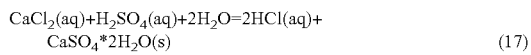
$$CaCl_2(aq)+H_2SO_4(aq)+2H_2O=2HCl(aq)+CaSO_4 \cdot 2H_2O(s) \tag{17}$$

Typically the temperature of the reactors is maintained under the boiling point of the sulphuric acid, typically under 100° C., typically in the range of 25 to 80° C. preferably in the range of 40 to 65° C., more typically 30 to 60° C., so that the precipitating calcium compound is gypsum, $CaSO_4 \cdot 2H_2O$. In such case the particle size of the solids is higher and the filterability of it is better. Sulphuric acid is fed into the reactors so that the calcium content after the final reactor is between 15 to 40 g/l Ca, typically 15 to 40 g/l. The precipitating gypsum is very pure, because in this acid concentration of 50 to 180 g/l HCl other metals do not precipitate. Typically, calcium chloride solution from ammonia regeneration is mixed with sulphuric acid solution so that gypsum and hydrochloric acid solution are formed. Typically the temperature of hydrochloric acid regeneration is between 25° C. and 80° C. and the concentration of the sulphuric acid in sulphuric acid solution is between 25% and 99%. Typically, the calcium concentration in solution after hydrochloric acid regeneration is 10 to 40 g/l.

The present invention relates also to an apparatus recovering metals from metalliferous starting materials comprising i) a leaching unit adapted for leaching the metalliferous starting material in chloride-based leaching liquor, ii) equipment adapted for withdrawing from the leaching unit i) aqueous chloride solution with dissolved metals, iii) a metal recovery unit adapted for recovering metal value from the aqueous chloride solution, iv) a neutralization unit adapted for neutralizing hydrogen chloride content of the aqueous chloride solution in the metal recovery unit with adding hydrolyzed ammonia to the process solution so as to form ammonium chloride, v) an ammonium regeneration unit and equipment for withdrawing ammonium chloride containing process solution to an ammonium regeneration unit where calcium containing reagent is added to generate calcium chloride and ammonia gas, and equipment for recycling ammonia back to the metal recovery unit iii), vi) a regeneration unit adapted for regenerating the $CaCl_2$-solution with $H_2SO_4$ and equipment for recycling an aqueous HCl solution to the leaching step i). Suitable equipment for acid regeneration includes for example reactor, cooling equipment, solid-liquid separation typically with thickener and/or filter and equipment for solid recycle for gypsum seeds.

According to an embodiment of the invention the metal recovery unit comprises equipment adapted for recovering of copper by liquid-liquid extracting by contacting the second solution with hydroxyoxime-based reagent diluted into diluent, such as kerosene. Suitable equipment include for example one or several mixer-settler-units for each step in the copper recovery and the phases flow in these units counter-currently. Steps in the recovery of copper are the extraction step, washing step and stripping step.

According to an embodiment of the invention the metal recovery unit comprises equipment adapted for recovery of copper by ion exchange.

According to an embodiment of the invention the metal recovery unit comprises equipment adapted for recovering copper by precipitating copper sulphide by using hydrogen sulphide. Suitable equipment include for example reactor, solid-liquid separation typically made with thickener and/or filter and equipment for solid recycle for seeds.

According to an embodiment of the invention the metal recovery unit comprises equipment adapted for extraction of cobalt by contacting the third solution with an extraction reagent diluted into diluent, such as kerosene. Suitable equipment include for example one or several mixer-settler-units for each step in the cobalt recovery and the phases flow in these units counter-currently. Steps in the recovery of cobalt are the extraction step, washing step with hydrochloric acid solution and/or washing with small amount of product solution from stripping step, stripping step and optional organic removal step from the raffinate.

According to an embodiment of the invention the metal recovery unit comprises equipment adapted for recovery of cobalt by ion exchange.

According to an embodiment of the invention the metal recovery unit comprises equipment adapted for the extraction of nickel by contacting the fourth solution with an extracting reagent. Suitable equipment include for example one or several mixer-settler-units for each step in the nickel recovery and the phases flow in these units counter-currently. Steps in the recovery of nickel are an extraction step, a washing step with hydrochloric acid solution and/or a washing step with small amount of product solution from stripping step, a stripping step and an optional organic removal step from the raffinate.

According to an embodiment of the invention the metal recovery unit comprises equipment adapted for recovery of nickel by ion exchange.

According to an embodiment of the invention the unit of recovering metal may also be an ion exchange unit.

LIST OF USED REFERENCE NUMBERS IN THE FIGURES 1 starting material
2 a leaching step
3 precipitation step
4 metal recovery step
5 copper precipitation step
6 copper extraction step
7 cobalt extraction step
8 nickel extraction step
9 $NH_3$ regeneration step
10 acid regeneration step
11 copper sulphide
12 copper electrowinning 13 cobalt precipitation step
14 nickel electrowinning
15 ammonia condensation
16 residue of impurities
17 metal(s) to be recovered
20 chloride-based leaching solution
21 oxygen-containing gas
22 the leaching residue
23 the first solution
31 neutralizing calcium-containing chemical
33 the second solution
50 hydrogen sulphide
53 the fourth solution
61 ammonia water
71 ammonia water
73 the fifth solution
81 ammonia water
83 the (sixth) solution from metal recovery
90 calcium oxide
91 calcium hydroxide
92 steam
93 the (seventh) solution containing calcium chloride
101 sulphuric acid
102 hydrochloric acid
103 recycled hydrochloric acid
104 gypsum
151 off-gas.

FIG. 1 is an example embodiment of the method of the invention in a general form wherein the method comprises providing starting material 1, chloride-based leaching solution 20 and oxygen-containing gas 21 to a leaching step 2, wherein the starting material is leached and the leaching residue 22 is separated from the solution and withdrawn from the leaching step 2. The first solution 23 is withdrawn from the leaching step 2 and fed to an optional precipitation step 3, as the method comprises an optional precipitation step 3 of precipitating iron and other impurities from the solution. Oxygen-containing gas 21 and neutralizing calcium-containing chemical 31 are fed to the precipitation step 3. Iron and other impurities are withdrawn from the precipitation step 3 as residue of impurities 16. The second solution 33 is withdrawn from the precipitation step 3 and fed to a metal recovery step 4. Ammonia water 61 is fed to the metal recovery step and metal(s) 17 are withdrawn from the metal recovery step 4. The solution 83 is withdrawn from the metal recovery step 4 and fed to $NH_3$ regeneration 9. Calcium oxide 90 or calcium hydroxide 91 are also fed to $NH_3$ regeneration 9. Regenerated ammonia is withdrawn and fed to ammonia condensation 15 from where the condensated ammonia is fed to metal recovery 4 as $NH_3$ water 61. The solution containing calcium chloride 93 is withdrawn from the $NH_3$ regeneration 9 and fed to acid regeneration 10 to which sulphuric acid 101 is also fed. Hydrochloric acid 102 and gypsum 104 are withdrawn from the acid regeneration and/or hydrochloric acid 103 is recycled and fed to leaching step 2.

Figure 2:
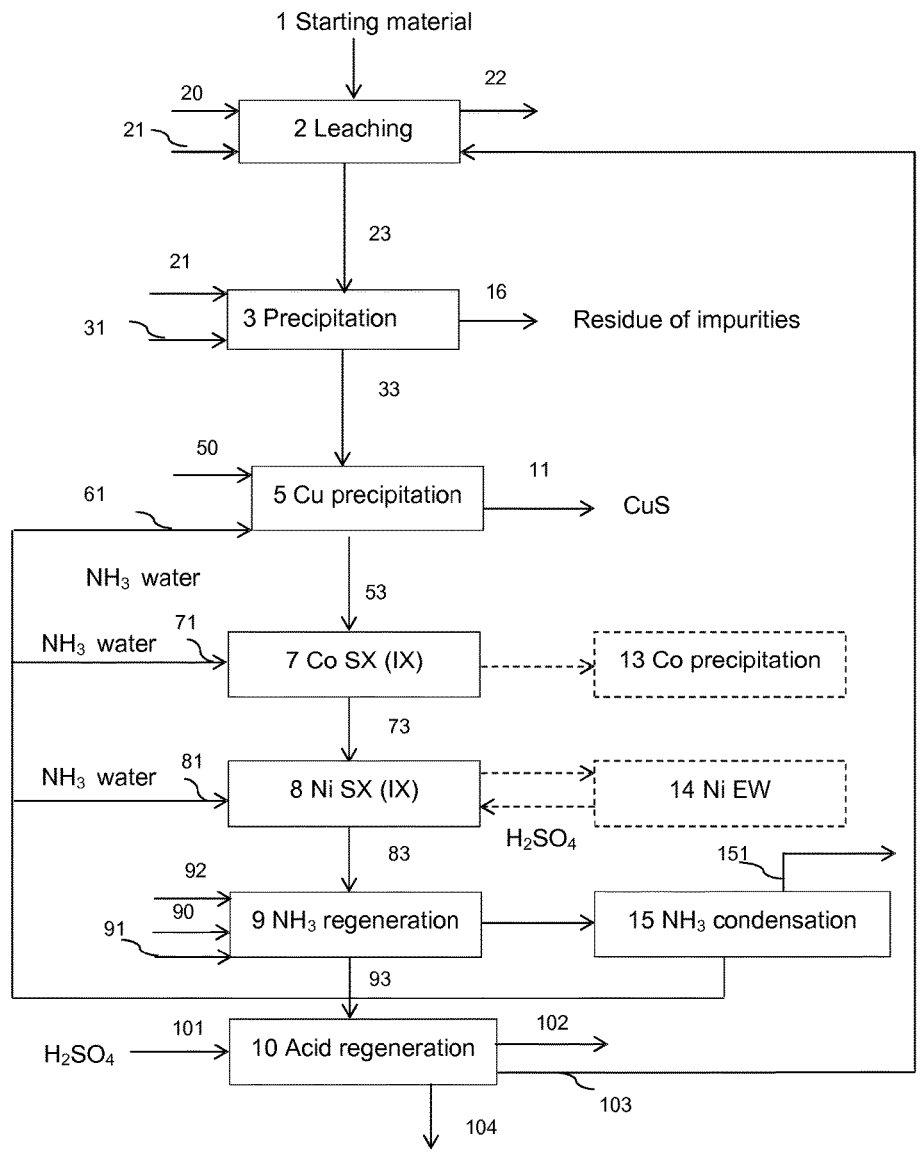
FIG. 2 is an example embodiment of the method of the invention wherein copper is recovered by precipitation.

FIG. 2 is an example embodiment of the method of the invention wherein the method comprises providing starting material 1, chloride-based leaching solution 20 and oxygen-containing gas 21 to a leaching step 2, wherein the starting material is leached and the leaching residue 22 is separated from the solution and withdrawn from the leaching step 2. The first solution 23 is withdrawn from the leaching step 2 and fed to an optional precipitation step 3, as the method comprises an optional precipitation step 3 of precipitating iron and other impurities from the solution. Oxygen containing gas 21 and neutralizing calcium-containing chemical 31 are fed to the precipitation step 3. Iron and other impurities are withdrawn from the precipitation step 3 as residue of impurities 16. The second solution 33 is withdrawn from the precipitation step 3 and fed to a copper precipitation step 5 for recovering copper as copper sulphide. Optionally there may be an evaporation step located between the precipitation step 3 and the copper recovery step 5 and in such a case the third solution from the evaporation is fed to copper precipitation step 5 (not shown in the figure). Hydrogen sulphide 50 and ammonia water 61 are fed to the copper precipitation 5. Copper sulphide 11 is withdrawn from the copper precipitation 5. From copper precipitation 5 the fourth solution 53 is withdrawn and fed to cobalt extraction 7. Ammonia water 71 is fed to cobalt extraction and the separated cobalt may be withdrawn and fed to cobalt precipitation 13. The fifth solution 73 is withdrawn from cobalt extraction and fed to nickel extraction 8. The cobalt extraction 7 and the nickel extraction 8 may be replaced by cobalt ion exchange 7 and/or by nickel ion exchange 8. Ammonia water 81 is fed to nickel extraction 8 and sulphuric acid may be fed to nickel extraction from nickel electrowinning 14, wherein the separated nickel may be recovered. The sixth solution 83 is withdrawn from the nickel extraction 8 and fed to $NH_3$ regeneration 9. Calcium oxide 90 or calcium hydroxide 91 are also fed to $NH_3$ regeneration 9. Ammonia is stripped to gas phase by adding steam 92 to ammonia regeneration. Regenerated, gaseous ammonia is withdrawn and fed to ammonia condensation 15 from where the condensated ammonia is fed to copper precipitation 5 as $NH_3$ water 61, cobalt extraction 7 as $NH_3$ water 71, and nickel extraction 8 as $NH_3$ water 81. Off-gas 151 from ammonia condensation is routed to gas scrubbing. The seventh solution containing calcium chloride 93 is withdrawn from the $NH_3$ regeneration 9 and fed to acid regeneration 10 to which sulphuric acid 101 is also fed. Hydrochloric acid 102 and gypsum 104 are withdrawn from the acid regeneration and/or hydrochloric acid 103 is recycled and fed to leaching step 2.

Figure 3:
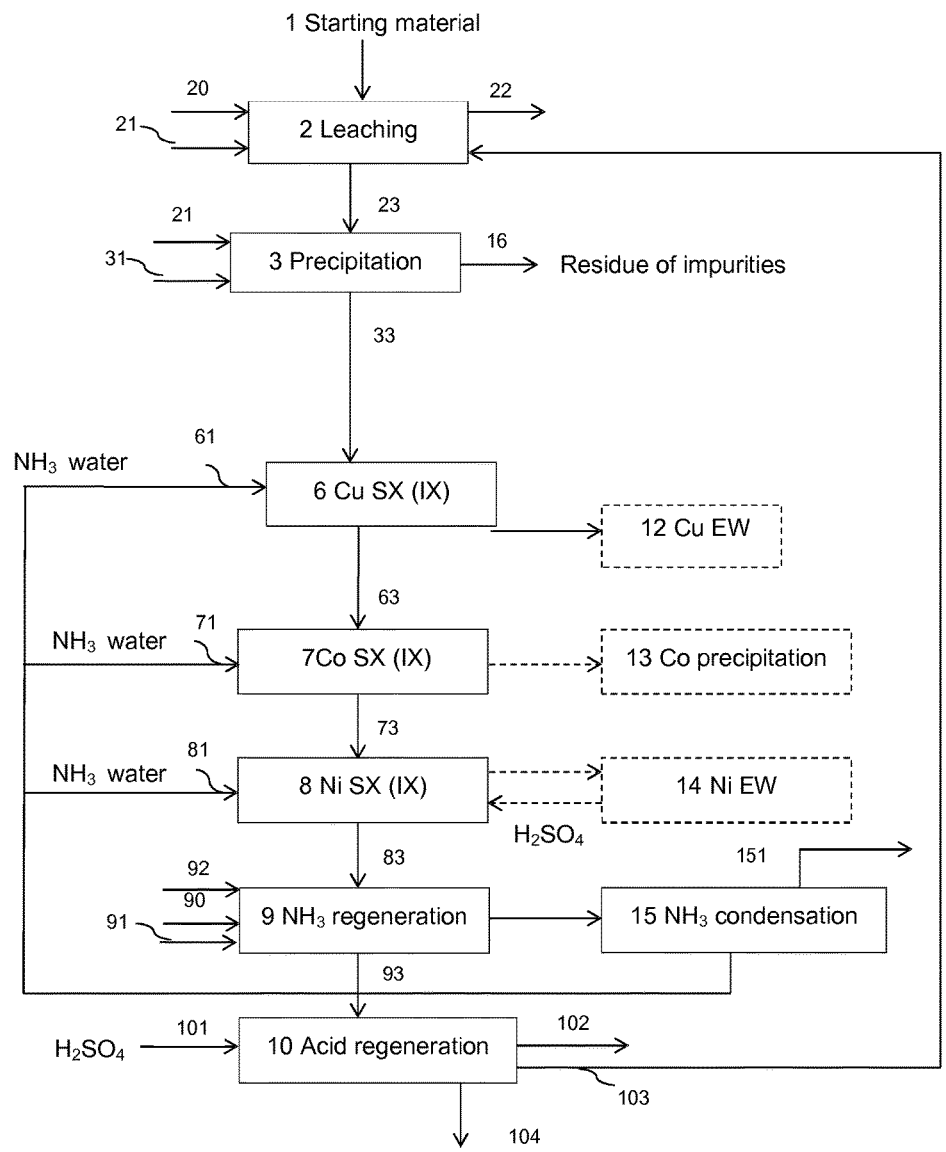
FIG. 3 is an example embodiment of the method of the invention wherein copper is recovered by extraction.
Figure 4:
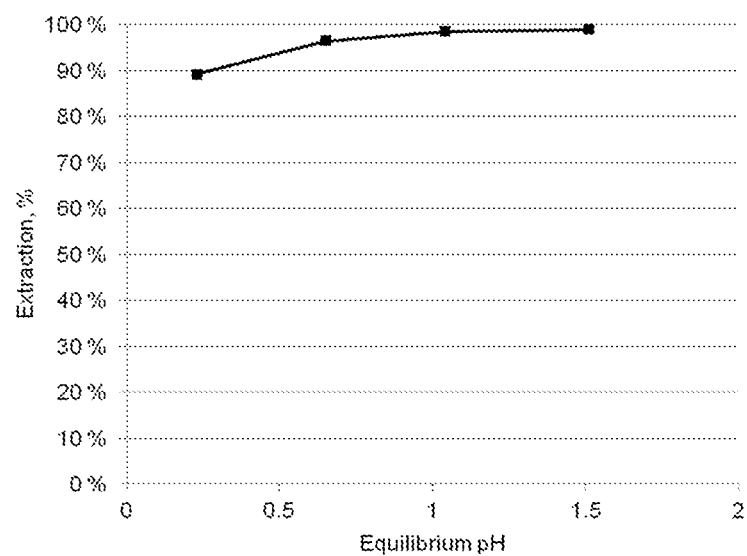
FIG. 4 is a diagram showing the relationship between Extraction percentage and equilibrium pH.

FIG. 3 is also an example embodiment of the method of the present invention and equals the method of FIG. 2 except that copper recovery is performed by copper extraction 6 and the extracted and separated copper may be directed further to an optional copper electrowinning 12. Alternatively the copper extraction 6 may be replaced by copper ion exchange.

EXAMPLES

Example 1a

Extraction of Nickel

Synthetic process solution was prepared from chloride slats of calcium, magnesium, nickel and ammonium. Commercial Versatic 10 extracting reagent, which has carboxylic acid as functional group was used in the experiment. A 40 vol-% solution was diluted from it into aliphatic Shellsoll D70 Kerosene. Organic phase was washed before the experiment once with an equal volume of 1 M hydrochloric acid. Metal concentrations were analysed in the experiment with ICP from water solutions. In the experiment 10 ml samples were taken which were stripped with 50 ml of 3 M hydrochloric acid. Metal concentrations in the organic phase were calculated based on the stripping samples.

Extraction experiment was done in a 1 liter glass mixing tank reactor and the reactor was temperature controlled to 50° C. 250 ml of organic phase and 375 ml of water phase were added to the reactor. Solutions were mixed until pH was adjusted to the value of 5.1 with ammonia. Mixing was continued for 1 minute after which the mixing was stopped and phases were let to separate. A sample was taken from both phases. 230 ml of loaded organic phase was measured to a separation funnel and 11.5 ml of 1 M hydrochloric acid was also added. Shaken for 10 min, phases were separated and samples were taken from both phases. After this 140 ml of washed organic phase was measured into a separation funnel and also wash solution was added which contained 13.3. g/l Ni and 6.3 g/l $H_2SO_4$. Solutions were shaken for 10 min, phases were separated and a sample was taken from both. Analysis results and metal concentration in the organic phase calculated from them are presented in Table 1. From there it can be seen that it is possible to extract nickel from the chloride solution and wash it so well that after stripping of the organic phase a pure nickel sulphate solution is obtained for electrolysis.

TABLE 1

Metal concentrations in nickel extraction

| Sample | Aqueous phase concentrations | | | | Organic phase concentrations | | |
|---|---|---|---|---|---|---|---|
| | [Ca], g/l | [Mg], g/l | [Ni], g/l | [NH4], g/l | [Ca], g/l | [Mg], g/l | [Ni], g/l |
| Before extraction | 84.5 | 0.518 | 40.9 | 11.6 | 0 | 0 | 0 |
| After extraction | 83.4 | 0.537 | 23.2 | N/A | 0.385 | 0.002 | 29.25 |
| After HCl wash | 7.34 | 0.0266 | 19.4 | 0.909 | 0.0425 | <0.001* | 28.1 |
| After NiSO4 wash | 0.34 | 0.0007 | 13.9 | 0.029 | <0.005* | <0.001* | 27.60 |

*below ICP analysis limit

Example 1 b

This example demonstrates leaching of nickel concentrate with a simultaneous iron precipitation. A nickel concentrate containing 4.9% Ni, 0.27% Co, 50.5% Fe, 36.2% S and 1.8% As was used in the experiment. The main minerals were pyrrhotite, pyrite, pentlandite.

Four liters of chloride solution containing 66 g/l Ca and 9 g/l Cu and 150 g of iron precipitate were measured in a 5 liter reactor. The solution was heated to 95° C., after which mixing was started and 2 kg of concentrate was added slowly during 4 hours. Concentrated hydrochloric acid was fed into the reactor to keep pH between 1.6 and 1.8. Oxygen was fed at a flow rate of 500 ml/min. Samples were taken from solids and solution at predetermined interval.

The duration of the experiment was 20 hours and after 16 hours nickel yield was 98% and cobalt yield 83%. The residue contained 0.056% Ni and 0.032% Co. Iron and arsenic were precipitated during nickel and cobalt leaching and the solution contained 0.17 g/l Fe and 0.004 g/l As. The results demonstrate leaching of nickel concentrate with a simultaneous iron and arsenic precipitation.

Example 2

A nickel matte was leached without iron precipitation. The matte was crushed so that it passed a 1 mm sieve. The nickel matte contained 43.8% Ni, 18.5% Cu, 13.6% Fe, 0.63% Co and 20.6% S.

Five liters of chloride solution with 60 g/l Ca, 5 g/l Cu and 82 g/l HCl was added to a five liter reactor. Reactor was heated to 95° C. temperature, mixing was started and oxygen was fed at 500 ml/min flow rate. 535 g of nickel matte was fed slowly during two hours into the reactor. 286 ml of concentrated hydrochloric acid was added during the experiment to keep final acid concentration at 5-20 g/l HCl.

Yields were 97.8% for nickel, 95% for copper, 97% for cobalt and 99% for iron after 14 hours. The residue contained 80.2% sulfur. The metal concentrations in the solution were 45 g/l Ni, 20 g/l Cu, 0.5 g/l Co, 12.3 g/l Fe and 0.026 g/l As. The results demonstrate the leaching of Ni, Co, Cu and Fe at low pH.

Example 3

Solution from example 2 was used for iron precipitation experiment. 3.07 liters of solution at 80° C. temperature was neutralized by $Ca(OH)_2$ slurry in a stirred reactor. Addition of $Ca(OH)_2$ slurry was done slowly during 4 hours to yield a better iron cake with fewer impurities. After 1.5 hours at pH 1.2 arsenic was already precipitated and its concentration was below ICP analytical limit. The final pH was 2.6 after 4 hours. The solution contained only 14.8 mg/l Fe and 149 mg/l S. Dry weight of the iron precipitate was 64.56 g and it contained 54.6% Fe, <0.01% Co, 0.068% Ni and 0.4% Cu.

Example 4

Copper was extracted from a chloride solution with a commercial hydroxyoxime reagent. The organic phase contained 40 vol-% LIX 984N reagent diluted in Shellsol D70 kerosene. Aqueous phase contained 21.2 g/l Cu, 106 g/l Ca, 1.1 g/l Co, 0.06 g/l Fe, 1.3 g/l Mg and 50 g/l Ni. An experiment was conducted in a one liter glass reactor. Equal volumes of aqueous and organic phases were added to the reactor. The solution was heated to 40° C. temperature. Phases were mixed and 10 ml samples were taken from aqueous phase after phases had been separated. Without any pH adjustment the copper extraction to organic phase was only 17%. Ammonia was added to the reactor and samples were taken at different equilibrium pH values. It can be seen from FIG. 3 that copper extraction is increased significantly at increased pH. Copper extraction is not possible in an economically reasonable way without adjusting pH during extraction.

Example 5

Cobalt and nickel were separated by solvent extraction in following example. Harmful impurities such as manganese for nickel electrowinning were also removed from the solution in cobalt solvent extraction. A synthetic process solution was made from chloride salts of Ca, Mg, Ni, Co, Mn and NH4. The metal concentrations are shown in table 1 and ammonium concentration was 9.5 g/l. Commercial phosphinic acid extractant with a trade name of Cyanex 272 was used in the experiment. The reagent was diluted to 16 vol-% in Shellsol D70 kerosene. The organic phase was washed once with an equal volume of 1 M hydrochloric acid. Metal concentrations in the experiment were analyzed from aqueous solutions. 10 ml samples were taken from organic phase in experiments and it was stripped with 50 ml of 3 M hydrochloric acid. The metal concentration in organic phase was calculated from mass balance based on analysis of the stripping sample.

Solvent extraction was done in a heat jacketed glass reactor at 50° C. temperature. 500 ml of organic phase and 500 ml of aqueous phase were added to the reactor. Mixing was started and pH was adjusted to a value of 3.8 by adding ammonia. The target pH was kept for one minute after which mixing was stopped and phases separated. Samples were taken from both phases.

Coextracted Ni and a significant part of calcium and magnesium were removed by scrubbing the loaded organic phase with 3 M hydrochloric acid. 480 ml of organic phase and 16 ml of 3 M hydrochloric acid were mixed in a separating funnel. The funnel was shaken for 10 minutes and after that phases were separated. Samples were taken from both phases.

The results are shown in table 2. Cobalt can be separation from nickel is excellent. If further calcium removal is desired, the organic phase can be scrubbed with cobalt chloride solution after which cobalt can be stripped and precipitated as a suitable product. Scrub solutions can be recycled back to extraction or elsewhere in the process.

solution and purified to meet nickel electrowinning requirements. Industrial processes have multiple extraction stages which increases nickel yield in extraction.

TABLE 3

Metal concentrations in nickel solvent extraction

| | Aqueous phase concentrations | | | | Organic phase concentrations | | |
|---|---|---|---|---|---|---|---|
| Sample | [Ca], g/l | [Mg], g/l | [Ni], g/l | [NH4], g/l | [Ca], g/l | [Mg], g/l | [Ni], g/l |
| Before extraction | 84.5 | 0.518 | 40.9 | 11.6 | 0 | 0 | 0 |
| After extraction | 83.4 | 0.537 | 23.2 | N/A | 0.385 | 0.002 | 29.25 |
| After HCl scrub | 7.34 | 0.0266 | 19.4 | 0.909 | 0.0425 | <0.001* | 28.1 |
| After NiSO4 scrub | 0.34 | 0.0007 | 13.9 | 0.029 | <0.005* | <0.001* | 27.60 |

*below ICP analysis limit

TABLE 2

| | Aqueous phase concentrations | | | | | Organic phase concentrations | | | | |
|---|---|---|---|---|---|---|---|---|---|---|
| Sample | [Co], g/l | [Ca], g/l | [Mg], g/l | [Mn], g/l | [Ni], g/l | [Co], g/l | [Ca], g/l | [Mg], g/l | [Mn], g/l | [Ni], g/l |
| Before extraction | 0.94 | 85.3 | 1.06 | 0.08 | 41.60 | 0 | 0 | 0 | 0 | 0 |
| After extraction | 0.14 | 84.4 | 0.92 | 0.01 | 41.60 | 0.95 | 1.98 | 0.17 | 0.08 | 0.029 |
| After HCl scrub | 4.66 | 49.2 | 4.15 | 0.14 | 0.64 | 0.79 | 0.31 | 0.01 | 0.08 | <0.005* |

*below ICP analysis limit

Example 6

Production of pure nickel sulphate solution from concentrated nickel and calcium chloride solution by solvent extraction was demonstrated with batch experiments. A synthetic process solution was made from chloride salts of Ca, Mg, Ni and NH4. Solvent extraction reagent was commercial Versatic 10, which has a carboxyl acid as a functional group. The reagent was diluted to 40 vol-% by adding Shellsol D70 kerosene which consists of aliphatic hydrocarbons. Organic phase was pretreated similarly as in example 4. Sampling, sample stripping and calculation of organic phase concentrations were also done in a same way as in example 5.

Solvent extraction was done in a heat jacketed glass reactor at 50° C. temperature. 250 ml of organic phase and 375 ml of aqueous phase were added to the reactor. Mixing was started and pH was adjusted to a value of 5.1 by adding ammonia. The target pH was kept for one minute after which mixing was stopped and phases separated. Samples were taken from both phases.

Loaded organic phase was first scrubbed with hydrochloric acid to remove most of the loaded calcium and ammonia. 230 ml of loaded organic and 11.5 ml of 1 M hydrochloric acid were added to a separating funnel. The funnel was shaken for 10 minutes and after that phases were separated. Samples were taken from both phases. The second washing was done with a diluted nickel sulphate electrolyte which contained 13.3 g/l Ni and 6.3 g/l H2SO4. 140 ml of once scrubbed organic phase was added to a separating funnel with 14 ml of nickel sulphate scrubbing solution. The funnel was shaken for 10 minutes, phases were separated and samples were taken from both phases.

Analyses and organic phase concentrations are shown in table 3. Nickel can be extracted from calcium chloride Example 7

Ammonia regeneration was tested with nitrogen gas stripping in a 2 liter glass reactor. The reactor contained 400 ml of slurry with 76.65 g of calcium hydroxide. Slurry was mixed and heated to 92° C. temperature. 400 ml of solution containing 105 g NH4Cl was added to the reactor in 30 seconds. According to stoichiometry in eq. ( ), there was 5.4% surplus of calcium hydroxide compared to ammonium chloride in this experiment. Heavy foaming indicating ammonia gas formation was observed during the experiment. Nitrogen gas flow of 500 ml/min was fed to the reactor. After 10 minutes gas flow was stopped and the reactor was allowed to cool down.

A solution sample was taken and ammonium concentration was analyzed by ionselective electrode. The sample was buffered so that all ammonia existed as ammonium ions. The ammonium concentration was 4.3 g/l. Solid residues were collected and dried. The weight of the solid residue was 6.07 g. Only 7.9% of $Ca(OH)_2$ had not reacted and taking into account the surplus and inert impurities in calcium hydroxide, almost a stoichiometric amount of calcium hydroxide had reacted.

Example 8

Hydrochloric acid was regenerated from calcium chloride solution in a continuous experiment. The experimental settings consisted of three reactors which each with two liter volume. Calcium chloride solution was pumped to the first reactor. The solution contained 152 g/l Ca, 3.2 g/l Na, 0.17 g/l Mg and 4 g/l $NH_4$. Sulphuric acid at 50 wt-% was pumped to the first two reactors. Temperature in each reactor was 50° C. Output of the last reactor was filtered and once per 15 minutes a batch of 50 g of moist filter cake was recycled back to the first reactor.

Hydrochloric acid concentration was 158 g/l and solid content 380 g/l at the output of last reactor after running the experiment 65 hours. The feed flow rates of calcium chloride solution and sulphuric acid were 1400 ml/h and 580 ml/h, respectively. This corresponds about 3 hours residence time. X-ray diffraction showed that the precipitate was gypsum. The moisture of gypsum cake was 25-30%. The filterability was 2770 kg/m2/h on dry basis.

It will be obvious to a person skilled in the art that, as the technology advances, the inventive concept can be implemented in various ways. The invention and its embodiments are not limited to the examples described above but may vary within the scope of the claims.

The invention claimed is:

1. A method for recovering metals from metalliferous starting materials comprising steps of
   i) leaching the metalliferous starting material in chloride-based leaching liquor having a chloride concentration between 100 g/l and 350 g/l,
   ii) withdrawing from the leaching step i) aqueous chloride solution with dissolved metals,
   iii) recovering metal value from the aqueous chloride solution in a metal recovery process step comprising solvent extraction,
   iv) neutralizing a hydrogen chloride content of the aqueous chloride solution in the metal recovery process step by adding hydrolyzed ammonia to form an ammonium chloride containing process solution,
   v) withdrawing the ammonium chloride containing process solution to an ammonium regeneration step where calcium-containing reagent is added to generate a calcium chloride solution and ammonia gas, and recycling the ammonia gas back to the metal recovery process step iii) to take part in a pre-neutralization,
   vi) regenerating the calcium chloride solution with $H_2SO_4$ so as to provide an aqueous hydrogen chloride solution for recycling to the leaching step i).

2. The method according to claim 1, wherein the starting material is selected from the group consisting of laterite ores containing the base metals nickel and cobalt, copper, cobalt, nickel metal-bearing raw materials, oxidized metalliferous material containing nickel, cobalt and copper, nickelferous sulfide material containing at least one other metal selected from the group consisting of cobalt, copper and iron, NiS precipitate, nickel matte, aqueous metal sulfate-containing solution the metals being selected from the group consisting of cobalt, copper, nickel and iron, nickel sulfide concentrate and mixtures thereof.

3. The method according to claim 1, wherein the temperature in the leaching step is between 80° C. and the boiling point of the solution.

4. The method according to claim 3, wherein the temperature in the leaching step is between 80 and 104° C.

5. The method according to claim 3, wherein the temperature in the leaching step is between 80 and 99° C.

6. The method according to claim 1, wherein the metal value to be recovered is selected from the group consisting of copper, cobalt and nickel.

7. The method according to claim 1, wherein ground nickel matte is fed as a reducing agent to the chloride-based leaching liquor.

8. The method according to claim 7, wherein gold and platinum group metals are recovered by precipitating into leach residue and recovering from the leach residue.

9. The method according to claim 1, wherein pH in the leaching step is between −0.5 and 1.5 so that iron is leached and a leach residue is formed, which is separated after which iron is precipitated at pH 1.5-2.6 with a calcium containing neutralization agent.

10. The method according to claim 1, wherein pH in the leaching step is between 1.5 and 2.6 so that iron is precipitated during the leaching.

11. The method according to claim 1, wherein, after metal recovery, there is a total sulfur concentration as sulfate of between 0.1 g/l and 1 g/l, causing iron precipitation.

12. The method according to claim 1, wherein copper is recovered as a part of step iii) by extraction by contacting the aqueous chloride solution containing copper with hydroxyloxime-based reagent diluted in a hydrocarbon solvent.

13. The method according to claim 1, wherein the method contains one or more copper solvent extractions and each of them contains 1-3 extraction stages, 1-3 washing stages and 1-3 stripping stages.

14. The method according to claim 1, wherein a copper extraction step is carried out, whereby copper is obtained in a raffinate, which copper is precipitated as atacamite at pH between 2.5 and 5.

15. The method according to claim 1, wherein cobalt is recovered as a part of step iii) by solvent extraction by contacting the aqueous chloride solution, which contains cobalt, with one or several extraction reagents diluted in a hydrocarbon solvent and where the extraction is based on cation exchange.

16. The method according to claim 1, wherein the method contains one or more cobalt solvent extractions and each of them contains 2-6 extraction stages, 1-3 washing stages and 1-4 stripping stages.

17. The method according to claim 1, wherein the cobalt is recovered as a part of step iii).

18. The method according to claim 1, wherein nickel is recovered, as a part of step iii), by solvent extraction by contacting the aqueous chloride solution, which contains nickel, with one or several extraction reagents diluted in a hydrocarbon solvent.

19. The method according to claim 1, wherein the process step iii) contains one or more nickel solvent extractions and each of them contains 2-6 extraction stages, 1-3 washing stages and 1-4 stripping stages.

20. The method according to claim 1, wherein ammonia is used in a solvent extraction that forms a part of step iii) to pre-neutralize a metal extractant molecule.

21. The method according to claim 1, wherein ammonia is fed directly to a solvent extraction that forms a part of step iii) to neutralize hydrochloric acid which is formed in extraction reactions.

22. The method according to claim 1, wherein calcium containing reagent in step v) is calcium oxide and/or calcium hydroxide.

23. The method according to claim 1, wherein temperature is 25-100° C. and pressure is 7-200 kPa in the ammonium regeneration step.

24. The method according to claim 1, wherein ammonia is stripped from solution to gas phase by using steam in the ammonium regeneration step.

25. The method according to claim 1, wherein calcium chloride solution from the ammonium regeneration step is mixed with sulfuric acid solution so that gypsum and hydrochloric acid solution are formed.

26. The method according to claim 1, wherein the temperature of the step of regenerating the calcium chloride containing solution is between 25° C. and 80° C. and the concentration of the sulfuric acid in sulfuric acid solution is between 25 wt-% and 99 wt-%.

27. The method according to claim 1, wherein the calcium concentration in the solution after the step of regenerating the calcium chloride containing solution is 10 to 40 g/l.

28. The method according to claim 1, wherein the copper is recovered, as a part of step iii), by solvent extracting by contacting the aqueous chloride solution containing copper with hydroxyoxime-based reagent diluted into kerosene, acting as a diluent.

29. The method according to claim 1, wherein copper is recovered, as a part of step iii), by precipitating copper sulfide with hydrogen sulfide.

30. The method according to claim 1, wherein the cobalt is recovered, as a part of step iii), by extraction by contacting the aqueous chloride solution, which contains cobalt, with an extraction reagent diluted into kerosene, acting as a diluent.

31. The method according to claim 1, wherein nickel is recovered, as a part of step iii), by extraction by contacting the aqueous chloride solution containing nickel with an extracting reagent.

\* \* \* \* \*